United States Patent
Martinez et al.

(10) Patent No.: US 9,353,551 B2
(45) Date of Patent: May 31, 2016

(54) WIRELESS DOOR LOCKING SYSTEM

(71) Applicant: Meghan Martinez, Chandler, AZ (US)

(72) Inventors: Meghan Martinez, Chandler, AZ (US); Andrew Martinez, Chandler, AZ (US); Eugene Overline, Gilbert, AZ (US); Ryan Allen, Gilbert, AZ (US); Craig Beiferman, Goodyear, AZ (US); David Spykerman, Mesa, AZ (US)

(73) Assignee: Meghan Martinez, Chandler, AZ (US)

( * ) Notice: Subject to any disclaimer, the term of this patent is extended or adjusted under 35 U.S.C. 154(b) by 135 days.

(21) Appl. No.: 14/219,989

(22) Filed: Mar. 19, 2014

(65) Prior Publication Data

US 2015/0267438 A1 Sep. 24, 2015

(51) Int. Cl.
*G05B 19/00* (2006.01)
*E05B 47/00* (2006.01)
*E05B 47/02* (2006.01)
(Continued)

(52) U.S. Cl.
CPC ............. *E05B 47/0001* (2013.01); *E05B 47/02* (2013.01); *E05B 2047/0058* (2013.01); *E05B 2047/0095* (2013.01); *G06F 21/31* (2013.01); *G07C 9/00007* (2013.01); *G07C 9/00087* (2013.01); *G07C 9/00571* (2013.01); *G07C 2009/00238* (2013.01); *H04W 4/043* (2013.01);
(Continued)

(58) Field of Classification Search
CPC ........... G07C 9/00007; G07C 9/00571; G07C 9/00087; G07C 2009/00238; H04W 12/06; H04W 4/043; H04W 12/04; G06F 21/31
USPC ....................................... 340/5.33
See application file for complete search history.

(56) References Cited

U.S. PATENT DOCUMENTS 4,727,368 A * 2/1988 Larson ..................... G07C 1/32
235/382
5,089,692 A * 2/1992 Tonnesson ......... G07C 9/00904
235/382

(Continued)

FOREIGN PATENT DOCUMENTS

TW GB 2445596 A * 7/2008 .......... H01J 49/0418
WO 2014007870 1/2014

OTHER PUBLICATIONS

Martinez, Meghan, Wireless Door Locking System, Patent Cooperation Treaty Application Serial No. PCT/US15/20915, filed Mar. 17, 2015, International Search Report and Written Opinion, dated Jun. 18, 2015.

*Primary Examiner* — Jennifer Mehmood
*Assistant Examiner* — Rufus Point
(74) *Attorney, Agent, or Firm* — Schmeiser, Olsen & Watts LLP

(57) ABSTRACT

A wireless door locking system is provided. The system includes a door lock having a locking device, a sensor and a microcontroller. The system also includes a mobile computing device having a display and a mobile application, wherein the mobile computing device is placed proximate to the door lock. The system includes a server in communication with the mobile computing device. The mobile application may generate a code such as a light pattern in response to communication with the server and transmits the light pattern from the display. The microcontroller of the door lock disengages the locking device in response to the sensor receiving the generated code communicated from the mobile computing device and determining that the generated code includes correct data to disengage the locking device of the door lock.

19 Claims, 5 Drawing Sheets

(51) Int. Cl.
 *H04W 12/04* (2009.01)
 *G07C 9/00* (2006.01)
 *G06F 21/31* (2013.01)
 *H04W 12/06* (2009.01)
 *H04W 4/04* (2009.01)

(52) U.S. Cl.
 CPC .............. *H04W 12/04* (2013.01); *H04W 12/06* (2013.01); *Y10T 70/7068* (2015.04)

(56) References Cited

U.S. PATENT DOCUMENTS

| | | | | |
|---|---|---|---|---|
| 5,742,236 A * | 4/1998 | Cremers | ................ | B60R 25/04 180/287 |
| 6,072,403 A * | 6/2000 | Iwasaki | ............. | G07C 9/00309 180/287 |
| 6,218,955 B1 * | 4/2001 | Conklin | ............. | G07C 9/00103 340/13.24 |
| 6,570,498 B1 * | 5/2003 | Frost | ................ | G07C 9/00079 340/5.2 |
| 6,720,861 B1 * | 4/2004 | Rodenbeck | ........ | G07C 9/00103 340/5.6 |
| 7,212,114 B2 * | 5/2007 | Yui | .......................... | G07C 1/10 340/426.35 |
| 7,825,796 B1 * | 11/2010 | Simon | .................... | G05B 15/02 340/286.02 |
| 8,786,400 B2 * | 7/2014 | Harkins | ............. | G07C 9/00103 340/5.2 |
| 2002/0057342 A1 * | 5/2002 | Yoshiyama | ....... | G08B 13/19634 348/153 |
| 2002/0180582 A1 * | 12/2002 | Nielsen | .............. | G07C 9/00103 340/5.6 |
| 2004/0002365 A1 * | 1/2004 | Ota | ........................ | G06Q 20/32 455/566 |
| 2004/0107031 A1 * | 6/2004 | Ichikawa | ................ | B60R 25/04 701/36 |
| 2006/0007005 A1 * | 1/2006 | Yui | .......................... | G07C 1/10 340/573.4 |
| 2006/0082454 A1 * | 4/2006 | Fukuda | .................. | H04N 7/186 340/531 |
| 2010/0201536 A1 | 8/2010 | Robertson et al. | | |
| 2012/0280783 A1 | 11/2012 | Gerhardt et al. | | |
| 2013/0176107 A1 | 7/2013 | Dumas et al. | | |
| 2013/0200994 A1 * | 8/2013 | Kannan | ............. | G06Q 10/0631 340/5.2 |
| 2013/0257590 A1 | 10/2013 | Kuenzi et al. | | |
| 2014/0002236 A1 | 1/2014 | Pineau et al. | | |
| 2015/0179012 A1 * | 6/2015 | Sharpe | ............. | G07C 9/00904 340/5.28 |

* cited by examiner

WIRELESS DOOR LOCKING SYSTEM

BACKGROUND

1. Technical Field

This disclosure relates generally to a door locking system and more particularly to a wireless door locking system for use by others.

2. State of the Art

Doors that provide access in and out of buildings and homes typically have locks in order to prevent unauthorized entrance. These locks are operated with keys of some type. In some instances the keys are conventional metal keys that are inserted within a keyhole in order to lift the proper tumblers the correct height to allow the key to rotate within the lock and disengage the locking device. Other locks include keypads that require a manual entry of a code in order to disengage the locking device. Further still, other locks include other forms of keyless entry, such as a FOB or card that utilizes wireless RF signals or a magnetic strip card. Each of these types of systems have drawbacks, either by having to manually change the code for entry or requiring a physical key, whether a metal key, a FOB or card, that must be given to another in order for them to gain entry into the building or home.

Accordingly, there is a need in the field of wireless door locks for an improved wireless door locking systems.

SUMMARY

The present disclosure relates to a wireless door locking system that provides for the use of a mobile computing device, such as, but not limited to a smartphone, to communicate with a door lock to disengage the locking device for entry into a structure.

An embodiment includes a wireless door locking system comprising a door lock comprising a locking device, a sensor and a microcontroller; and a mobile computing device comprising a mobile application. The mobile application may generate a code and send it to the door lock. Further, the microcontroller of the door lock disengages the locking device in response to the sensor receiving the generated code communicated from the mobile computing device.

Another embodiment includes a method of using a wireless door locking system, the method comprising searching for a property on a system website; scheduling a property; unlocking a door lock in response to sending a code from a mobile computing device to the door lock; locking the door lock when the door is closed after a set amount of time for viewing has expired; and invalidating the code sent from the mobile computing device to the door lock.

Another embodiment includes a wireless door lock comprising an inner assembly comprising a microcontroller, a power source and an actuator, an outer assembly comprising a sensor electronically coupled to the microcontroller, and a locking device operatively coupled to the actuator. The microcontroller may execute instructions provided in firmware stored on the microcontroller to send a signal to the actuator in response to the sensor communicating a received code to the microcontroller. The actuator may be activated and unlock the locking device in response to receiving a signal from the microcontroller.

The foregoing and other features and advantages of the present disclosure will be apparent from the following more detailed description of the particular embodiments of the disclosure, as illustrated in the accompanying drawings.

BRIEF DESCRIPTION OF THE DRAWINGS

A more complete understanding of the present disclosure may be derived by referring to the detailed description and claims when considered in connection with the Figures, wherein like reference numbers refer to similar items throughout the Figures, and:

DETAILED DESCRIPTION OF EMBODIMENTS

Figure 1:
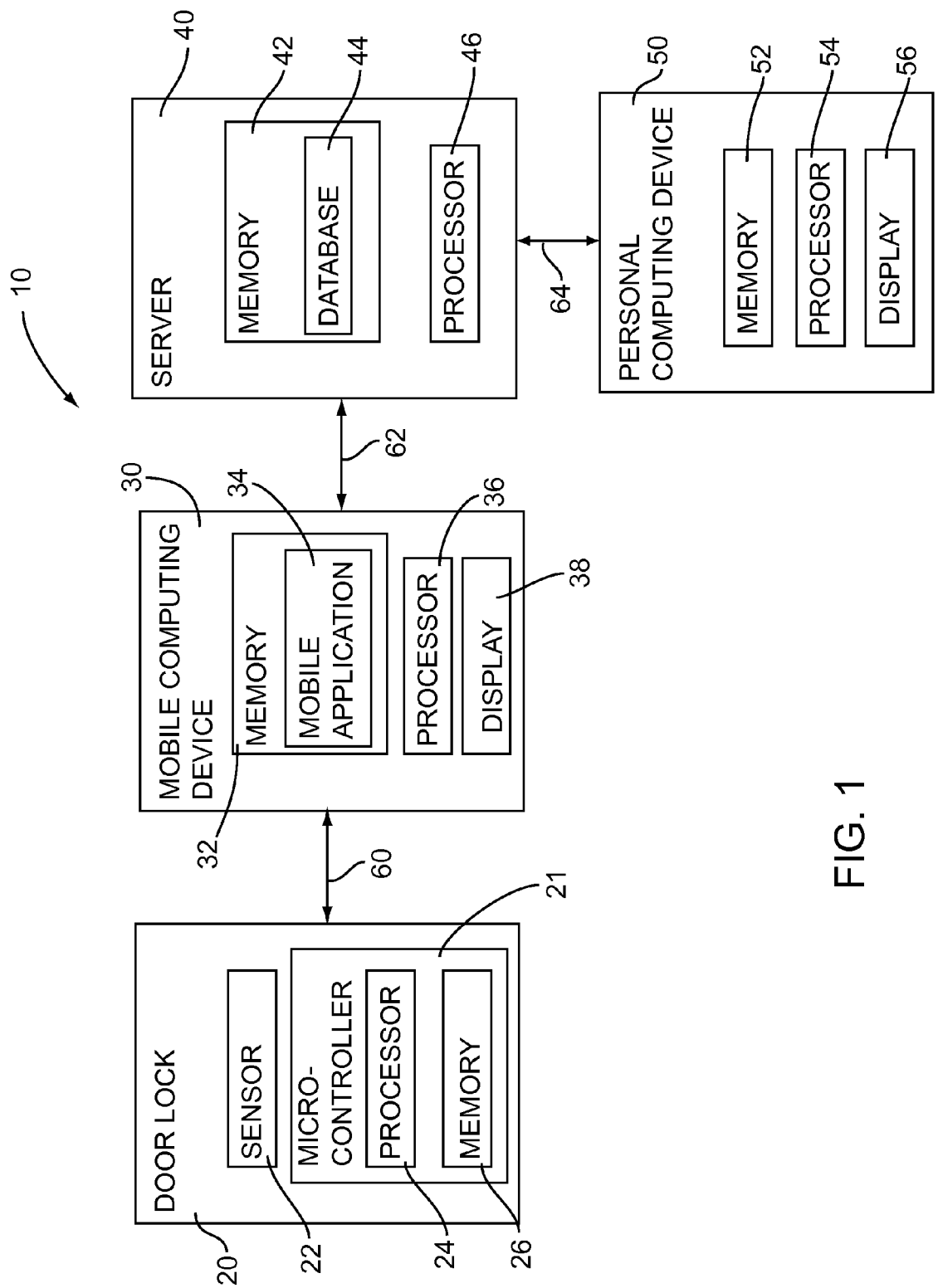
FIG. 1 is a schematic diagram of wireless door locking system.

As discussed above, embodiments of the present disclosure relate to a wireless door locking system that provides for the use of a mobile computing device, such as, but not limited to a smartphone, to communicate with a door lock to disengage the locking device for entry into a structure Referring to the drawings, FIG. 1 depicts an embodiment of a wireless door locking system 10. The system 10 may generally include a door lock 20, a mobile computing device 30, a server 40 and a personal computing device 50. The door lock 20 may include a sensor 22, and a microcontroller 21 having a processor 24 and a memory 26. The mobile computing device 30 may include a memory 32 that stores a mobile application 34, a processor 36 and a display 38. The server 40 includes a memory 42 and a processor 46. The personal computing device includes a memory 52, a processor 54 and a display 56. The mobile computing device 30 communicates with the door lock 20 through communication line 60. The server 40 and mobile computing device 30 communicate with each other through communication line 62. The personal computing device 50 and the server 60 communicate with each other through communication line 64. The communication lines 60, 562 and 64 may be any form of communication line, such as a network connection, Internet, wireless connection, such as Wi-fi, Bluetooth, LAN, WLAN, or other type of connection. In certain embodiments, connection line 60 is an optical communication line.

Figure 2A:
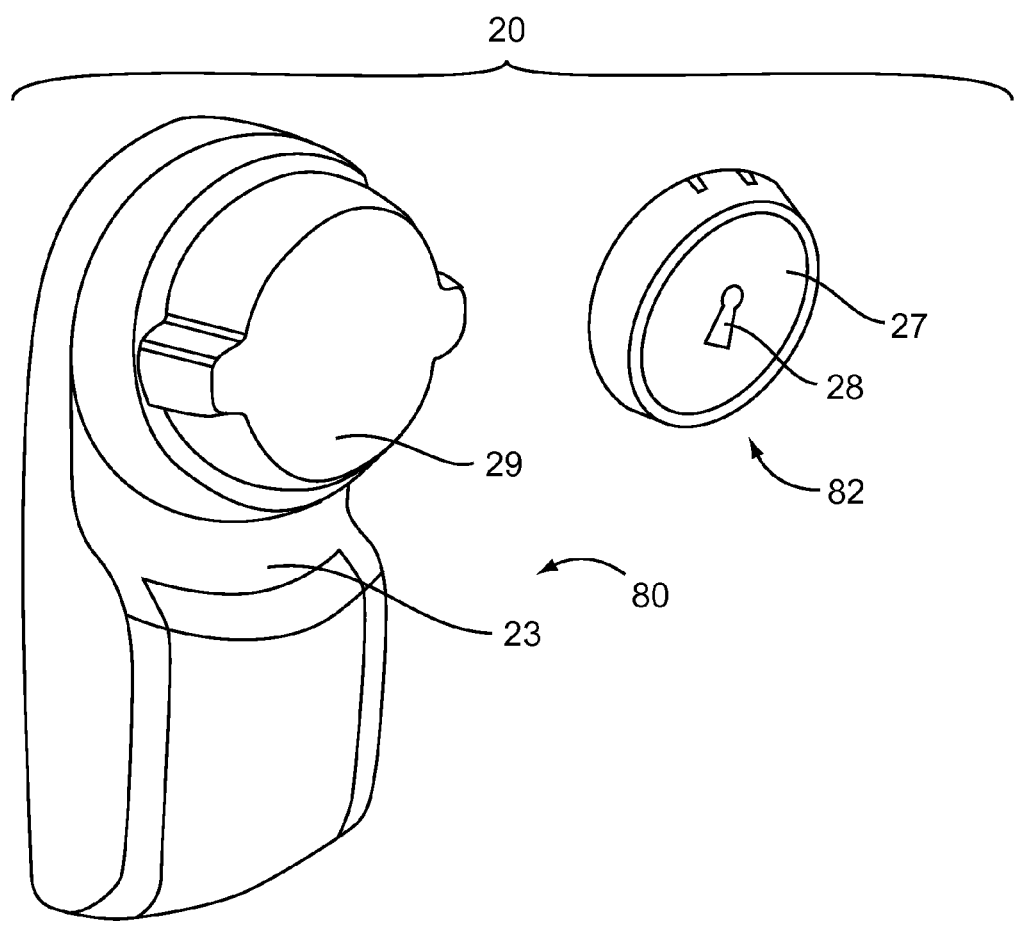
FIG. 2A is a perspective view of a door lock for use in a wireless door locking system.
Figure 2B:
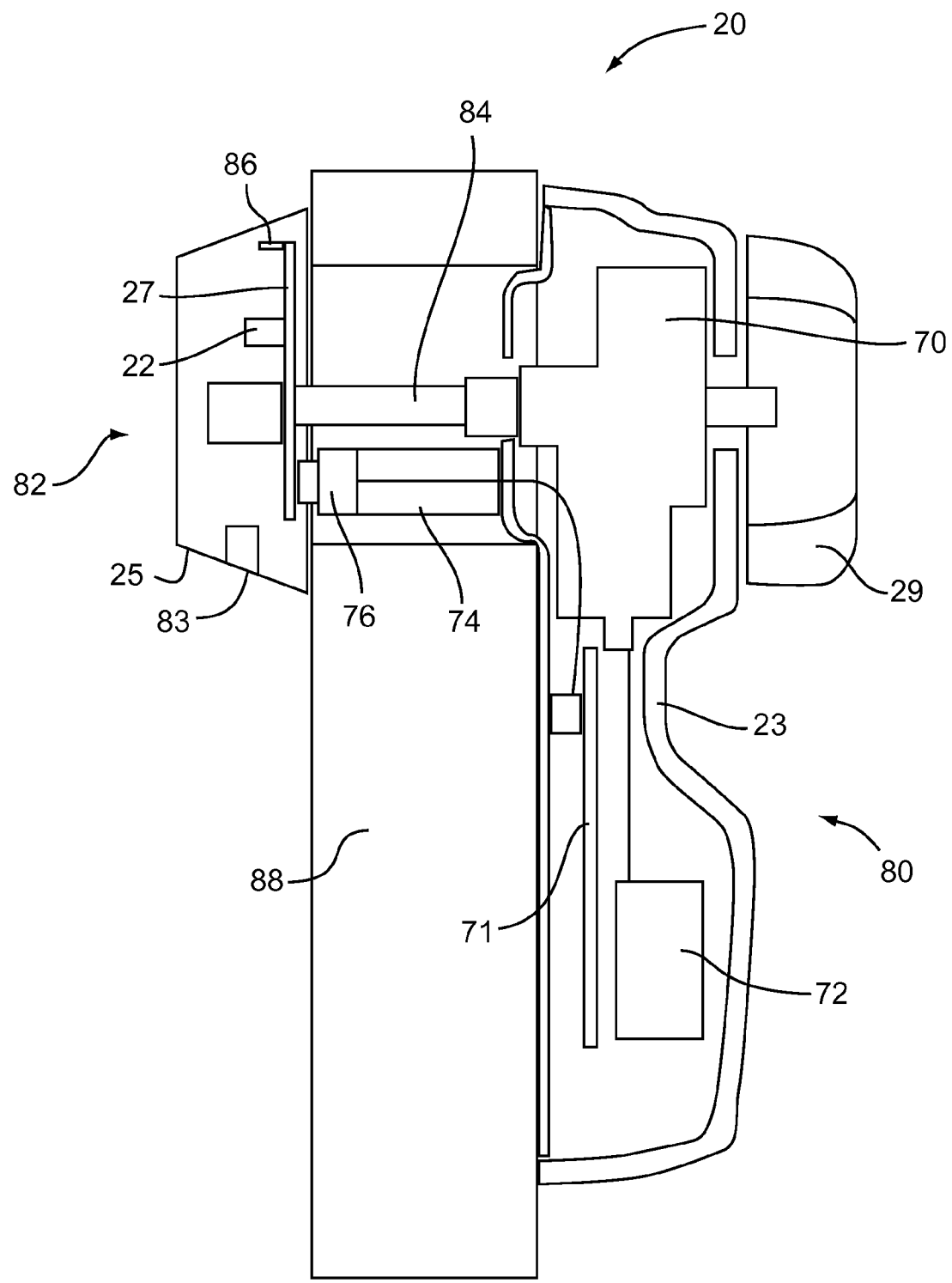
FIG. 2B is a section view of a wireless door lock attached to a door.

With regard to the door lock 20 and reference to FIGS. 2A-2B, the sensor 22 operates to receive communication data from the mobile computing device 30 and communicate it to the microcontroller 21. The processor 24 executes code stored as firmware on the memory 26 in response to the sensor 22 receiving a communication from the mobile computing device 30. The processor 24 determines if the communication data received by the sensor 22 includes the correct data to unlock the locking device of the door lock 20.

The mobile computing device 30 may have the mobile application 34 stored on the memory 32. The mobile application 34 is a light-weight application that occupies a comparatively small amount of display space and system memory, does not include unused features, performs a specific and somewhat limited function, and executes quickly and efficiently. The mobile application 34 provides secure access to the server 40 via a simple interface. In various embodiments, the mobile application 34 may be built and deployed on various platforms and operating systems. For example, some mobile applications 34 may be iPhone apps, Android apps, BlackBerry apps, Windows apps and so forth.

In operation, the processor 36 executes instruction provided by the mobile application 34 in order to produce communication data to send to the sensor 22 of the door lock 20. In some embodiments, the communication data is light transmission of data. Light transmission of data includes the mobile computing device 30 operating the mobile application 34, wherein the processor generates light pattern in response to executing instructions provided by the mobile application 34, and the light pattern is sent to the display 38 of the mobile computing device 30. The light pattern for example, and without limitation, may be a blinking pattern on the display 38, an image on the display 38, a QR code on the display, and the like. In these embodiments, the sensor 22 may be an optical sensor. The light pattern is based on a predetermined sensor rate with a check sum code to verify the code has been read completely and correctly. The light may pass through a small screen 28 on the outside member 25 of the door lock 20 located on the outside portion of a door.

The door lock 20 may be a keyless lock and may further include an inner assembly 80 coupled to a door 88 on an inside of a property that may comprise a housing 23 that retains an actuator 70, a power source 72, a stanchion 74, a connector 76 and the microcontroller 21 within the housing 23. In operation, the power source 72 provides power to the microcontroller 21 and the actuator 70, wherein the actuator 70 may be motorized actuator. The stanchion 74 operates off of the inner assembly 80 with the connector 76 to interface with electronic components of an outer assembly 82 coupled to the door 88 on an outside of a property. The outer assembly 82 may include an outer housing 25 that retains a sensor 22 and a circuit board 27 coupled to the sensor 22 within the outer housing 25. The connector 76 interfaces with the circuit board 27 allowing communication between the sensor 22 and the microcontroller 21. Accordingly, when the sensor 22 receives a code from a mobile computing device 30, the code may be understood by the microcontroller 21, wherein the firmware stored on the microcontroller may be executed to determine whether to unlock the door lock 20. If the code received by the sensor 22 is correct, the microcontroller 21 sends a signal to the actuator 70 to activate the actuator 70 and thereby turn shaft 84 to unlock the door lock 20. If the code received by the sensor 22 is incorrect, the microcontroller 21 does not send a signal and the door lock 20 remains locked.

The door lock 20 includes the ability to automatically lock. For example, and without limitation, the lock may engage automatically upon closing of the door, upon a predetermined time after processing of the code occurs, or any other mode of automatically locking the door. The door lock 20 further comprises a manual knob 29 that may be a part of the inner assembly 80, wherein the knob 29 is operatively coupled to the shaft 84, such that rotation of the manual knob 29 results in rotation of the shaft 84 to manually disengage the lock. This is important for instances when a user on the inside of a property and the door lock 20 has automatically locked, the user may use the manual knob 29 to open the door and leave the property.

While it has been discussed that the wireless communication between the mobile computing device 30 and the door lock 20 is a light transmission of data to an optical sensor, in other embodiments, the communication data is a code that is wirelessly transmitted to the sensor by other wireless communication types. These communication types include, without limitation, Bluetooth, Wi-fi, RF, sound transmission and the like. The sensor 22 would be a sensor suitable for receiving such transmissions of data.

The server 40 may include a memory 42 and a processor 46. The server 40 may be protected by conventional security to restrict access to the server 40. For example, this may be achieved through the use of a firewall that is designed to prevent an unauthorized user from accessing the server 40. The server 40 includes a database 44 stored on the memory 42 to store registration information from users. The server 40 may also process code stored in the memory 42 by processor 46 in order to the code and information to provide a website, wherein the website is accessible by users using the user's personal computing device 50. The website allows for registration to use the system 10.

The personal computing device 50 may include a memory 52, a processor 54 and a display 56. The memory 52 and processor 54 provide the necessary ability for the personal computing device 50 to utilize a network connection to access the website of the system 10 provided by the server 40. The personal computing device 50 is used to input information into the website for registration purposes.

Figure 3:
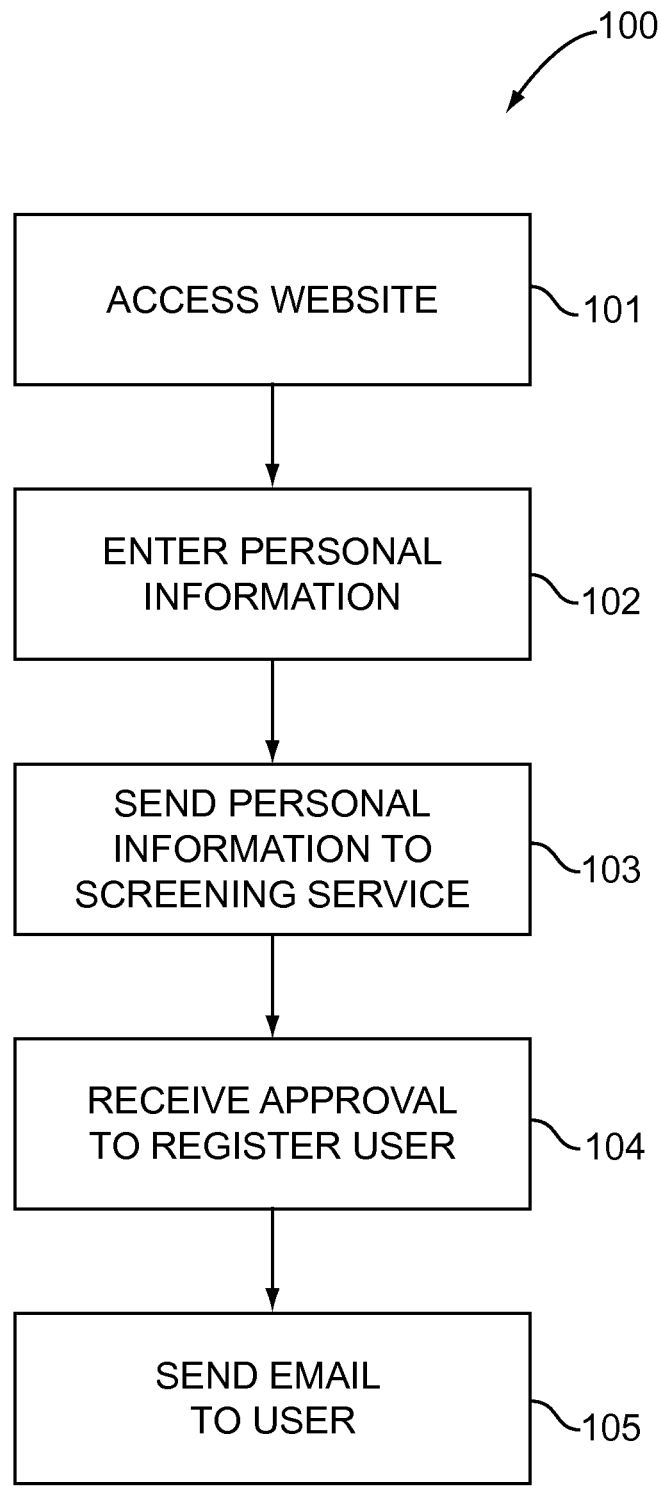
FIG. 3 is a flow chart showing the registration process.

Referring again to the drawings, FIG. 3 depicts an embodiment of a registration process 100. The registration process 100, with reference to FIG. 1, may include accessing the website of the system 10 by a user (Step 101). The user may access the website from his or her personal computing device 50. Then the user enters personal information (Step 102). The personal information may include a user name, name, email, phone number, date of birth, driver's license number and state, and the like. Then the system 10 sends the personal information to a screening service (Step 103). The system 10 then receives approval for the user to register from the screening service (Step 104). The system 10 then sends an email to the user (Step 105). The email may include a statement identifying that they have been approved to view properties, a link to download the mobile application 34, login information, and a temporary password with a link to the website to change the password.

It will be understood that other registration information necessary may be included, such as but not limited to, accepting payment for the service and the like, as well as other functionality for users that are property managers or brokers.

Once registered and the mobile application 34 is downloaded, the mobile application 34 may provide certain functionality, such as, but not limited to a) Map & Geo-location; b) Calendar/Scheduling function; c) choosing # of Bedrooms, Baths, Square Footage and Stories of the property; d) Ability to handle/store pictures; e) "Favorites" option to store multiple listings; f) Push Notifications; g) Reporting; and h) Website functionality.

Figure 4:
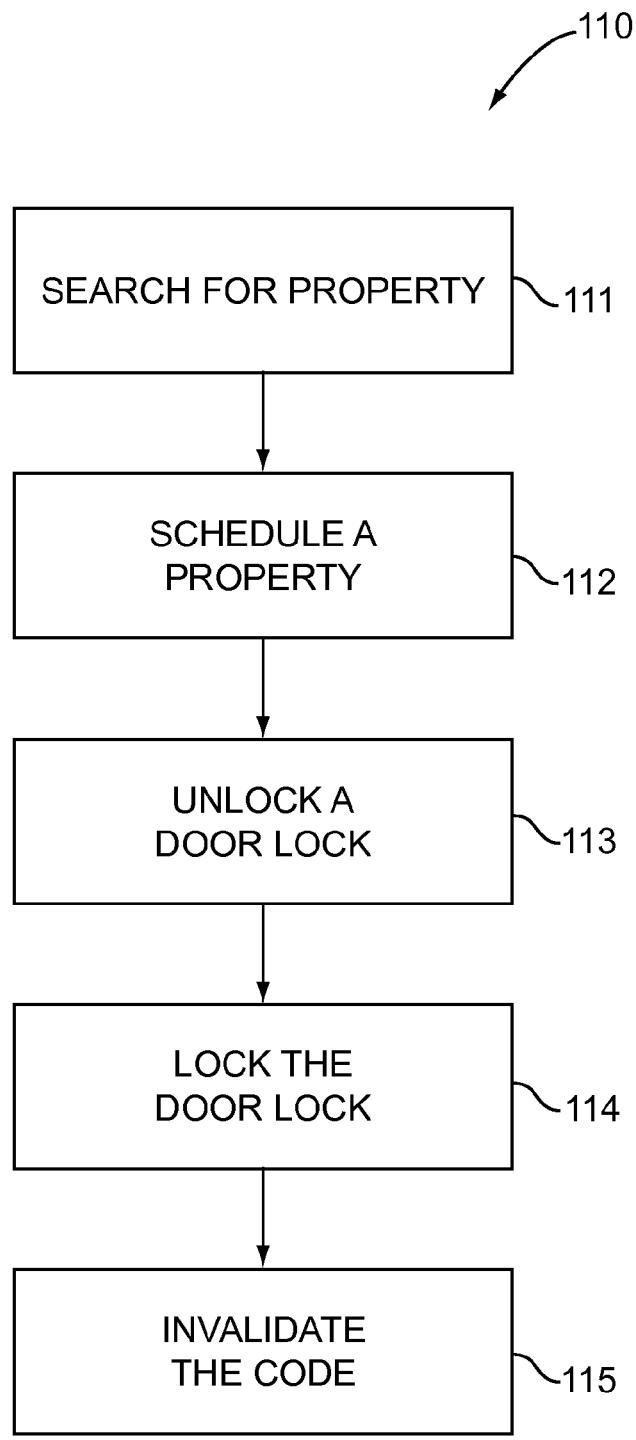
FIG. 4 is a flow chart showing a method of operating a wireless door locking system.

Referring again to the drawings, FIG. 4 depicts a method 110 of operating a wireless door locking system. The method 110 includes, with further reference to FIG. 1, searching for a property on the system website (Step 111). The user may search for properties by entering certain search criteria, such as, without limitation: a) Location (City, Zip Code, Neighborhood, School); b) Approximate Moving timeframe, such as 1-14 days, 15-30 days, 31-45 days, 46-60 days, 61+ days, for searches of rental or on sale properties; c) Date of vacation for vacation properties; d) Rate (Min-Max); e) Bed (use search criteria, such as that used by Redfin®); f) Bath (use search criteria, such as that used by Redfin®); g) Lease term (M-T-M, 6 mo., 12 mo., 24 mo.+); h) Pool; i) Section 8 accepted; and j) Pets/no pets, Less than 40 lbs or More than 40 lbs. In some embodiments, the search may be performed from a personal computing device 50 or from a mobile computing device 30. In some instances, the personal computing device 50 may be the mobile computing device 30 accessing the system 10 through a website. In some embodiments, the system 10 may notify the user if new listings are added that meet his or her criteria.

The method 110 then includes scheduling a property (Step 112). The scheduling can be performed from the website utilizing a scheduling module (not shown). For rental and purchase homes, this can be done to schedule a viewing. For a vacation property, this is for scheduling a date to rent the property. When scheduling a property, the scheduling module may display a calendar with a drop down list of available dates and times to view or available dates to rent. Once the date and time is selected, the system 10 saves the viewing to the profile of the user and the mobile application 34 is updated with the viewing or vacation information. When selecting multiple properties to view, the mobile application 34 is updated to show a chronological order of the properties to be viewed. The mobile application 34 may also include a property description and possible images, and an address having a geo location specific link for driving directions from navigation software operable on the mobile computing device. In embodiments, the mobile application 34 receives information with regard to properties from the server. This information may be accessed by set times of download, or through "push" data updates.

The method 110 then includes unlocking a door lock 20 in response to sending a code from the mobile computing device 30 to the door lock 20 (Step 113). Step 113 may include placing the mobile computing device 30 proximate the door lock 20, such as, but not limited to within a predetermined distance from the door lock 20, which will activate the Capacitive Touch Screen (CTS). Step 113 further includes unlocking the locking device of the door lock 20 in response to a sensor receiving a code from the mobile computing device 30. In embodiments, the code may be a transmission of light data. The light data may be a coded blinking sequence from the display 38 of the mobile computing device 30, an image emanating from the display 38 of the mobile computing device 30, a QR code, or the like. Step 113 further includes sounding an alert by the door lock 20 to notify that door has been unlocked.

The method 110 may also include the mobile application 34 alerting the user that he or she has set amount of time to view the home. The method 110 may also include automatically warning the user when a predetermined amount of time remains in the set amount of time to view the home. It will be understood that in a vacation property, the amount of time may include from the time and date of check-in until the check-out date and time.

The method 110 may also include locking the door lock 20 when the door is closed after the set amount of time for viewing/renting has expired (Step 114). If the locking device engages when the user is still in the property, the door lock 20 has a manual knob 29 that functions to allow the user open the door to leave the property. Upon closing of the door, the locking device automatically engages.

The method 110 finally includes invalidating the code sent from the mobile computing device 30 to the door lock 20 (Step 115). This allows for the user to only have limited access to the property. As discussed previously, the door lock 20 includes a microcontroller 21. The microcontroller 21 includes firmware that provides instruction for the processor 22 of the microcontroller 21 to perform operations. In response to a lock triggered event, such as, but not limited to, the expiration of the set amount of time for viewing or staying in the property, the microcontroller 21 performs operations according to an algorithm to invalidate the used code and validate another code. Further, a server triggered event may correspond to the lock triggered event, wherein upon execution of the server triggered event, the processor 46 of the server 40 performs functions in accordance with a software application 48 operating on the server 40 to invalidate the used code and then validate another code by performing operations according to an algorithm that corresponds to the algorithm operating on the microcontroller 21 of the door lock 20. The system 10 may then send the new code to a mobile computing device 30 based on the schedule of the system. In at least this way, the code used to disengage the door lock 20 is invalidated and a new code selected without needing the door lock 20 to communicate with the server 40.

Other server trigger events may be used beyond that previously discussed. For example and without limitation, the mobile application 34 may operate to send information to the server after it has used the code to open the door lock 20, or after a predetermined time established by the server 40 at the time of scheduling a viewing or renting of the property.

The system 10 may include other consideration when used by a property manager or broker. Once a property manager ("PM") or a broker has registered to use the system 10, a link may be sent to download the mobile application 34 and to create a company website account. The company website account may include the following: 1) Upload company info- (email, physical address, phone number(s)); 2) Identify number of user accounts & activate such as Agents, PM's, and Assistants; 3) Choose a service tier & pricing options; 4) Identify # of listings to be loaded; and 5) Complete billing information (from company to the system), including whether to Choose Monthly vs Annual billing cycle.

The PM can log into a password protected site and may be able to upload active leases; import property data from MLS listings/system; provide a complete listing template where property data and pictures can be entered, such as import capability from MLS and major PM software suites; PM assigns lock (serial #) to listing and writes the address on lock packaging for install; Update profile/control settings/Push notifications; Background rating system; and setting available viewing times.

The system 10 when used by PMs may include Push Notification Options to the mobile application 34, such as, but not limited to Viewing Scheduled; Viewing Completed; Viewing(s) Missed; Survey was submitted; Application requested; and Low Battery (5 days) for the battery of a particular door lock.

The system 10 may also allow PMs to Fill in owner information; Enable Owner Portal; and include a Dashboard setup for PM. The dashboard allows the PM to show: Listings; Days on Market (DOM); Viewing history (scheduled, completed, missed); Surveys completed; and Contact info for individuals viewing a listing. The system also allows for Reporting Capabilities. It will be understood that all or some of these function may be accessible through the mobile application 34 downloaded onto the mobile computing device 30. In other embodiments, certain functionality may be performed using the Internet to access the system website in order to perform some functions and then utilizing the mobile application 34 for specific functions.

PMs may use this system to rent out homes or buildings on a long term or in a vacation type setting. When utilized in the vacation rental industry, the mobile application 34 may include the functionality of having a map and geo-location, address and picture of the rental property, push notifications, a 4-digit passcode to access the application, link to online rating systems, and contextual advertising framework. The website may function to include listing spaces, lock ordering capabilities, account setup for billing purposes, calendar for scheduling vacationers and vendors and auto-generating the code that will be sent to the mobile computing device of the vacationer granting access to the property.

The embodiments and examples set forth herein were presented in order to best explain the present disclosure and its practical application and to thereby enable those of ordinary skill in the art to make and use the disclosure. However, those of ordinary skill in the art will recognize that the foregoing description and examples have been presented for the purposes of illustration and example only. The description as set forth is not intended to be exhaustive or to limit the disclosure to the precise form disclosed. Many modifications and variations are possible in light of the teachings above without departing from the spirit and scope of the forthcoming claims.

The invention claimed is:

1. A wireless door locking system comprising:
   a door lock comprising a locking device, an optical sensor and a microcontroller; and
   a mobile computing device comprising a mobile application, wherein:
   the mobile application generates a light pattern and sends it to a display of the mobile computing device;
   the mobile computing device communicates the light pattern to the optical sensor; and
   the microcontroller of the door lock disengages the locking device in response to the optical sensor receiving the light pattern communicated from the mobile computing device; and
   the microcontroller performs operations according to an algorithm to invalidate the used code and validate another code, and wherein a processor of a server performs functions in accordance with a software application operating on the server to invalidate the used code and then validate another code by performing operations according to an algorithm that corresponds to the algorithm operating on the microcontroller of the door lock.

2. The system of claim 1, further comprising a server, wherein the mobile application communicates with the server to generate the code.

3. The system of claim 1, wherein microcontroller comprises a processor and a memory.

4. The system of claim 3, wherein the microcontroller further includes firmware stored in the memory, wherein the processor executes instructions provided by the firmware to determine if the code received by the sensor of the door lock includes correct data to disengage the locking device of the door lock.

5. The system of claim 1, wherein the locking device of the door lock automatically engages after a predetermined amount of time has expired from time of disengagement of the locking device.

6. A method of using a wireless door locking system, the method comprising:
   searching for a property on a system web site;
   scheduling a property;
   unlocking a door lock in response to sending a code from a mobile computing device to the door lock;
   locking the door lock when the door is closed after a set amount of time for viewing has expired; and
   invalidating the code sent from the mobile computing device to the door lock, wherein a microcontroller of the door lock performs operations according to an algorithm to invalidate the used code and validate another code, and wherein a processor of a server performs functions in accordance with a software application operating on the server to invalidate the used code and then validate another code by performing operations according to an algorithm that corresponds to the algorithm operating on the microcontroller of the door lock.

7. The method of claim 6, wherein searching for property includes entering search criteria through a website of the system.

8. The method of claim 7, wherein scheduling the property comprises operating a scheduling module, wherein the scheduling module includes a drop down list of available dates and times for a particular property.

9. The method of claim 8, wherein scheduling the property comprises sending information regarding the property to the mobile application of the mobile computing device.

10. The method of claim 6, wherein unlocking the door lock further comprises placing the mobile computing device proximate the door lock.

11. The method of claim 10, further comprising activating a capacitive touch screen in response to placing the mobile computing device proximate the door lock.

12. The method of claim 11, wherein unlocking the door lock further comprises unlocking the door lock in response to a sensor of the door lock receiving a transmission of light data in a coded blinking sequence from a display of the mobile computing device.

13. The method of claim 6, further comprising generating the code in response to operation of a mobile application on the mobile computing device.

14. The method of claim 13, wherein generating the code further comprises generating the code at a server and sending instruction to generate the code to the mobile computing device.

15. The method of claim 14, wherein the mobile application transmits the code in response to execution of the instructions received from the server.

16. A wireless door lock comprising:
   an inner assembly comprising a microcontroller, a power source, an actuator, and a manual knob;
   an outer assembly comprising a sensor electronically coupled to the microcontroller; and
   a locking device operatively coupled to the actuator, wherein:
   the microcontroller executes instruction provided in firmware stored on the microcontroller to send a signal to the actuator in response to the sensor communicating a received code to the microcontroller;
   the actuator is activated and unlocks the locking device in response to receiving a signal from the microcontroller;
   the microcontroller performs operations according to an algorithm to invalidate the used code and validate another code, and wherein a processor of a server performs functions in accordance with a software application operating on the server to invalidate the used code and then validate another code by performing operations according to an algorithm that corresponds to the algorithm operating on the microcontroller of the door lock; and
   the manual knob manually disengages the lock from the inner assembly.

17. The wireless door lock of claim 16, wherein the sensor is an optical sensor.

18. The wireless door lock of claim 17, wherein the code is a light pattern.

19. The system of claim 16, wherein the locking device of the door lock automatically engages after a predetermined amount of time has expired from time of disengagement of the locking device.

* * * * *